March 4, 1969          E. L. IRWIN          3,431,421
ELECTRO-OPTICAL DEVICE HAVING IMPROVED COUPLING
Filed April 14, 1966
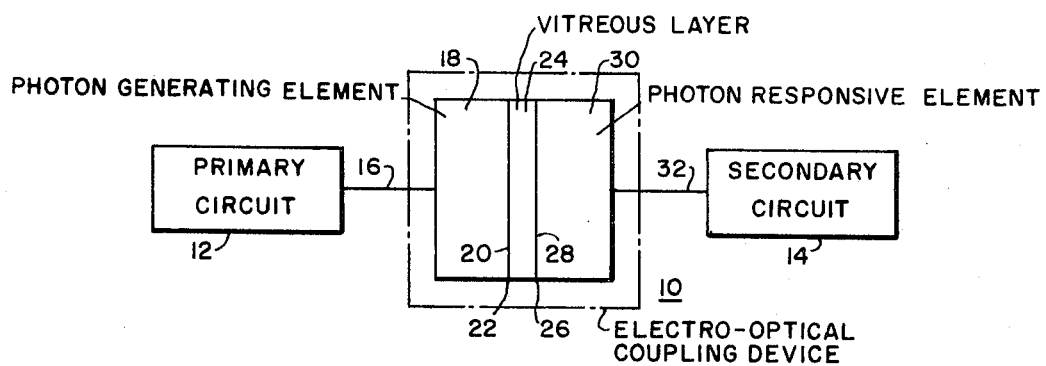
WITNESSES:
Leon M. Garman
Paul Wentzel
INVENTOR
Edgar L. Irwin
BY
W. D. Palmer
ATTORNEY

United States Patent Office 3,431,421
Patented Mar. 4, 1969

3,431,421
ELECTRO-OPTICAL DEVICE HAVING
IMPROVED COUPLING
Edgar L. Irwin, Glen Burnie, Md., assignor to Westinghouse Electric Corporation, Pittsburgh, Pa., a corporation of Pennsylvania
Filed Apr. 14, 1966, Ser. No. 542,650
U.S. Cl. 250—211
Int. Cl. H01j 39/12, 5/16; G02b 5/00
9 Claims

ABSTRACT OF THE DISCLOSURE

A combination in which a photon-emitting semiconductor is joined to a photon-responsive semiconductor by a composition permitting efficient optical transfer. The composition consists essentially by weight of 23–37% arsenic, 24–46% thallium, 27–39% sulfur, and 0–10% selenium. The specific weight percentages of elements which make up the composition are determined so that the composition has an index of refraction approximating that index which permits optimum optical coupling between the semiconductive elements.

---

This invention relates generally to electro-optical coupling between circuit elements and, more particularly, to such coupling wherein the photon transfer efficiency therebetween is optimized.

Heretofore, some electric circuits have been electro-optically coupled by the interaction of a light-generating or photon-generating semiconductor element and a light-responsive or photon-responsive semiconductive element. The primary circuit was connected to a photon-generating element which generated photons in response to electric signals from the primary circuit. These photons passed into a photon-responsive element and were converted back into electric signals which were applied to the secondary circuit, thus completing the electro-optical coupling.

A drawback of this prior art device is that an air gap existed between the photon-generating element and the photon-responsive element, even though the elements were adjacently supported. This air gap caused losses in the transmitted radiation. The loss at each air interface was approximately 20% of the radiation passing thereacross. The total loss between the semiconductor elements was approximately 36%. Attempts have been made to employ optical grease or oil between the elements for matching the indices of refraction at these interfaces and reduce the amount of radiation lost. However, the indices of refraction of the semiconductor elements are too high (generally from about 2 to about 4) to be matched successfully with the available greases and oils. In addition, such oils and greases generally do not transmit in the infrared region of the spectrum, which is the preferred emission and absorption region of semiconductor elements involved.

It is, therefore, an object of this invention to provide an electro-optical device having an improved optical coupling medium therein.

It is a further object of this invention to provide an electro-optical device having a more efficient optical coupling medium therein.

It is another object of this invention to provide an electro-optical device having a coupling medium which provides mechanical support for the device.

It is an additional object of this invention to provide an electro-optical device in which the optical coupling medium hermetically seals the device.

Briefly, these and other objects are achieved by providing a continuous vitreous layer between a photon-generating semiconductor element and a photon-responsive semiconductor element. The vitreous layer is tightly adhered to the elements for providing good optical transfer and mechanical support between the layer and the semiconductor elements. The vitreous layer is formed of arsenic, thallium and sulfur, with or without selenium, in such proportions to establish optimum photon transfer between the semiconductor elements. The index of refraction of the layer is generally higher than the index of refraction of the available optical greases and oils. Further, the device may be hermetically sealed by extending the layer material around the elements. This is conveniently accomplished during manufacture when the layer material is in a softened state.

For a better understanding of the invention, reference should be made to the accompanying detailed description and to the sole figure of the accompanying drawing, which is an elevational view of the present electro-optical coupling device, with associated primary and secondary circuits shown in block form.

Referring to the figure, there is shown an electro-optical coupling device 10 (enclosed by a dot-dash line) for coupling a primary circuit 12 to a secondary circuit 14. Electric signals from the primary circuit 12 pass along a conducting means 16 to the device 10 where they are converted into photons by a photon-generating semiconductor element 18. The photons pass out of the photon-generating element 18 through the radiation-emitting surface 20 thereof, across the interface 22 and enter a continuous vitreous layer 24. The photons then are transmitted through the layer 24, across the interface 26, through a photon-receiving surface 28 and into a photon-responsive semiconductor element 30 where they are converted back into electric signals. The electric signals are applied to the secondary circuit 14 through connecting means 32, thus completing the coupling between the primary circuit 12 and the secondary circuit 14. The photon-emitting surface 20 of the photon-generating element 18 is tightly adhered to the layer 24 along interface 22 to provide mechanical support and a good optical transfer between the layer 24 and the element 18. Similarly, the photon-receiving surface 28 of photon-responsive element 30 is tightly adhered to the layer 24 along interface 26.

The vitreous layer 24 comprises by weight about 23 to 37% arsenic, 24 to 46% thallium, 27 to 39% sulfur, and 0 to 10% selenium, and may be composed of the materials throughout these ranges to obtain the desired index of refraction The specific composition of the layer 24 depends on the semi-conductor material in the particular elements 18 and 30 used. The photon-generating semiconductor element 18 comprises at least one material of the group consisting of gallium arsenide, gallium phosphide, gallium arsenide phosphide, indium arsenide, and indium phosphide. Preferably, the element 18 is a forward biased diode suitably doped with elements such as zinc or cadmium in the P-type portion and silicon, tellurium, or selenium in the N-type portion. The photon-responsive semiconductor element 30 comprises one material of the group consisting of silicon, cadmium selenide, and lead sulphide. As is known, such devices usually incorporate a doping constituent, such as boron and phosphorus in the silicon, and copper in the cadmium selenide. The composition of the layer 24 is such that the photon transfer efficiency thereof is optimized. From a theoretical viewpoint, the index of refraction of the layer 24 should be approximately equal to $\sqrt{n_1 n_2}$; where $n_1$ is the index of refraction of the photon-generating element 18 and $n_2$ is the index of refraction of the photon-responsive element 30. This optical matching of the indices of refraction insures that the photons are transmitted across the device 10 with maximum efficiency.

The tight adhesion between the layer 24 and the elements 18 and 30 prevents the formation of air bubbles or pockets along the interfaces 22 and 26 during manufacture and use. The presence of such air would interfere with the optical coupling. Further, the tight adhesion provides mechanical support to hold the device 10 together. Of course, other means of support may be employed. For example, the device 10 may be held together by a conventional outer casing.

The tight adhesion is initially accomplished by placing a powder having the composition of the desired layer 24 between the semiconductor elements 18 and 30. This partially formed device is then heated to fuse the powder into a noncrystalline, continuous layer 24. This softening temperature is maintained while pressure is applied between the semiconductor elements 18 and 30 to eliminate any air bubbles in the layer 24 and along the interfaces 22 and 26. If desired, the vitreous substance extruded from between the elements 18 and 30 may be flowed around the elements 18 and 30 encapsulating them to form a hermetic seal. Of course, other sealing means may be employed, such as a conventional plastic outer coating. The device 10 is then allowed to cool to room temperature gradually. The powder softens at a temperature low enough so that the elements 18 and 30 are not harmed during the heating and pressing. The maximum allowable heating temperature is about 350° C. A temperature of about 200° C. less is preferred. The resulting layer 24 is rigid at room temperature and holds the device 10 together.

The following examples are illustrative of this invention.

EXAMPLE I

The photon-generating element 18 comprises the semiconductor material gallium arsenide having an index of refraction of about 3.22, and the photon-responsive element comprises silicon having an index of refraction of about 3.25. Using the square root formula described hereinbefore wherein $n_1=3.22$ and $n_2=3.25$, the theoretically preferred value of the index of refraction of the layer 24 is about 3.23. The desired composition of the vitreous layer 24, as determined by experimentation, is by weight about 30% arsenic, 36% thallium, and 34% sulfur. The measured index of refraction of the layer 24 having this composition is about 3.4 and provides an optical coupling which is at least 95% efficient. The indexes of normal glasses and available optical grease and oils are about 1-1.5, and cannot be used effectively with these semiconductors.

The particular semiconductor device used was a four-layer device having an ON-OFF volt-ampere characteristic in a latching circuit. Transistors of the usual type, having a continuous control characteristic, may be employed.

The silicon photon-responsive element 30 of Example I may be employed with all of the remaining photon-emitting semiconductor materials with good results. The preferred composition of the layer 24 for each photon-generating element 18 is summarized in Table I.

Table I

| Photon-generating element 18: | Composition of layer 24 |
|---|---|
| Gallium arsenide | 30% As, 36% Tl, 34% S. |
| Gallium phosphide | 27% As, 40% Tl, 31% S, 2% Se. |
| Gallium arsenide phosphide | If the arsenic is greater than the phosphorus, use the above gallium arsenide composition. If the phosphorus is g r e a t e r than the arsenic, use the above gallium phosphide composition. |
| Indium arsenide | 35% As, 28% Tl, 29% S, 8% Se. |
| Indium phosphide | 25% As, 36% Tl, 35% S, 4% Se. |

EXAMPLE II

The photon-generating element 18 comprises gallium phosphide having an index of refraction of about 3.0. The photon-responsive element 30 comprises cadmium selenide having an index of refraction of about 2.7. The calculated theoretically preferred value of the index of refraction of the layer 24 is about 2.84. The composition of the layer 24 in this example is by weight about 27% arsenic, 40% thallium, 31% sulfur, and 2% selenium, and has a measured index of refraction of about 2.3. The cadmium selenide may be used with other photon-generating semiconductor materials as specified in the following Table II.

Table II

| Photon-generating element 18: | Composition of layer 24 |
|---|---|
| Gallium arsenide | 30% As, 36% Tl, 34% S. |
| Gallium phosphide | 27% As, 40% Tl, 31% S, 2% Se. |
| Gallium arsenide phosphide | If the arsenic is greater than the phosphorus, use the above gallium arsenide composition. If the phosphorus is g r e a t e r than the arsenic, use the above gallium phosphide composition. |
| Indium arsenide | 35% As, 28% Tl, 29% S, 8% Se. |
| Indium phosphide | 25% As, 36% Tl, 35% S, 4% Se. |

EXAMPLE III

The photon-generating element 18 comprises indium arsenide having an index of refraction of about 2.4. The photon-responsive element 30 comprises lead sulfide having an index of refraction of about 4.0. The calculated theoretical index of refraction of the layer 24 in this example is about 3.1. The composition of the layer 24 in this example is by weight about 27% arsenic, 36% thallium, 31% sulfur, and 6% selenium, and has an index of refraction of about 3.0. Both cadmium sulfide and lead sulfide are photo-conductive materials having continuous characteristics.

All of the remaining photon-generating semiconductor materials may be employed with the lead sulfide. The preferred compositions of layer 24 are summarized in Table III.

Table III

| Photon-generating element 18: | Composition of layer 24 |
|---|---|
| Gallium arsenide | 28% As, 34% Tl, 32% S, 6% Se. |
| Gallium phosphide | 30% As, 36% Tl, 34% S. |
| Gallium arsenide phosphide | If the arsenic is greater than the phosphorus, use the above gallium arsenide composition. If the phosphorus is greater than the arsenic, use the above gallium phosphide composition. |
| Indium arsenide | 27% As, 36% Tl, 31% S, 6% Se. |
| Indium phosphide | 27% As, 36% Tl, 31% S, 6% Se. |

It will be apparent to those skilled in the art that the objects of this invention have been achieved by providing an optical coupling medium for an electro-optical coupling device. The composition of the medium is such that optimum optical transfer is achieved. If desired, the coupling medium may mechanically hold the system together and may be extended around the system for encapsulating and hermetically sealing the system.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

I claim as my invention:

1. In combination with a photon-generating semiconductor element having a photon-emitting surface and comprising at least one material of the group consisting of doped gallium arsenide, gallium phosphide, gallium arsenide phosphide, indium arsenide, and indium phosphide, and a photon-responsive semiconductor element having a photon-receiving surface and comprising one material of the group consisting of silicon, cadmium selenide and lead sulfide, the improved optical coupling medium for coupling said elements, said medium comprising: a continuous vitreous layer positioned between said elements and tightly adhered to the photon-emitting surface of said photon-generating element and tightly adhered to the photon-receiving surface of said photon-responsive element for providing good optical transfer and mechanical support between said elements, said layer consisting essentially of by weight 23–37% arsenic, 24–46% thallium, 27–39% sulfur, and 0–10% selenium, and said layer having an index of refraction approximating that index which permits optimum optical coupling between said elements.

2. The combination as specified in claim 1, wherein said photon-generating semiconductor element comprises gallium arsenide and said photon-responsive semiconductor element comprises silicon.

3. The combination as specified in claim 2, wherein the composition of said layer by weight is about 30% arsenic, 36% thallium, and 34% sulfur.

4. The combination as specified in claim 1, wherein said photon-generating semiconductor element comprises gallium phosphide and said photon-responsive semiconductor element comprises cadmium selenide.

5. The combination as specified in claim 4, wherein the composition of said layer by weight is about 27% arsenic, 40% thallium, 31% sulfur, and 2% selenium.

6. The combination as specified in claim 1, wherein said photon-generating semiconductor element comprises gallium arsenide and said photon-responsive semiconductor element comprises lead sulfide.

7. The combination as specified in claim 6, wherein the composition of said layer by weight is about 28% arsenic, 34% thallium, 32% sulfur, and 6% selenium.

8. The combination as specified in claim 1, wherein said coupling medium extends around and encapsulates said elements for hermetically sealing said elements and said layer.

9. The combination as specified in claim 1, wherein the index of refraction of said layer is about $\sqrt{n_1 n_2}$, where $n_1$ is the index of refraction of said photon-generating element, and $n_2$ is the index of refraction of said photon-responsive element.

References Cited

UNITED STATES PATENTS

| | | | |
|---|---|---|---|
| 3,284,722 | 11/1966 | Gray | 317—235 |
| 3,304,429 | 2/1967 | Bonin et al. | 250—211 |
| 3,354,316 | 11/1967 | Deverall | 250—211 X |

WALTER STOLWEIN, *Primary Examiner.*

U.S. Cl. X.R.

250—227